April 14, 1925.
1,533,791
H. P. EILERS
PISTON LINING DEVICE
Filed July 24, 1920
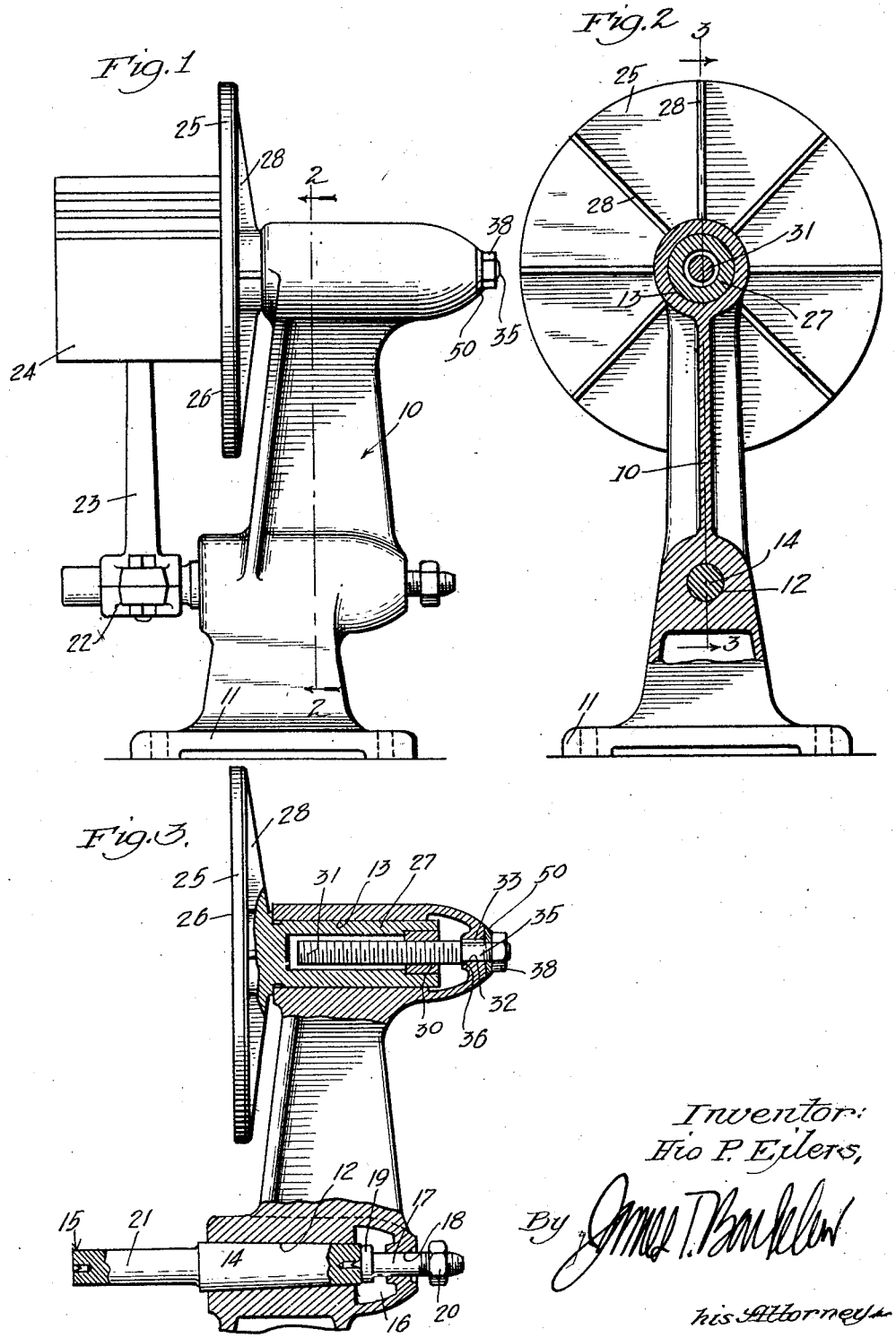

Patented Apr. 14, 1925.

1,533,791

UNITED STATES PATENT OFFICE.

HIO P. EILERS, OF LOS ANGELES, CALIFORNIA, ASSIGNOR TO RALPH M. BURDICK, OF LOS ANGELES, CALIFORNIA.

PISTON-LINING DEVICE.

Application filed July 24, 1920. Serial No. 398,770.

*To all whom it may concern:*

Be it known that I, HIO P. EILERS, a citizen of the United States, residing at Los Angeles, county of Los Angeles, State of California, have invented new and useful Improvements in Piston-Lining Devices, of which the following is a specification.

This invention has to do with a piston lining device particularly useful in testing the alinement of pistons and connecting rods and an object of the invention is to provide an improved device of this character which is adjustable, simple in operation, and simple and inexpensive in construction.

The present device is best adapted for use in testing pistons and connecting rods although it will be understood that it is not in any way limited to such specific application as it might well be adapted for use in testing various other machine parts, or the like, which are similar in their general construction and characteristics to pistons and connecting rods. For purpose of illustration and to facilitate in making clear the invention I am herein setting forth the device specifically as a piston and connecting rod testing device, it being understood, of course, that such disclosure is not to act as a limitation or restriction of the scope of the invention.

In the manufacture and repair of engines, especially internal combustion engines of the general character used in automobiles and the like, proper alinement of the pistons and connecting rods, or proper alinement of the bearings and wearing surfaces of the pistons and connecting rods, is essential and is therefore tested before such parts are installed. To test these parts the piston and connecting rods are assembled and the crank pin bearing of the connecting rod is arranged on a suitable spindle so that the alinement of the piston can be effectively tested by a face plate.

A particular feature of the invention is the provision of a simple effective means for ejecting or removing the spindle from the machine to permit of different size spindles being used when required. This feature of the invention makes the device convenient and desirable for use and is therefore noteworthy and important.

Another important feature of the device is the adjustability and manner of adjusting the face plate. The face plate by being easily adjustable can be manipulated to properly and accurately test the alinement of a piston. The form of adjusting means provided by the present invention is extremely simple and is such that the face plate can be delicately adjusted by rotating it. This manner of adjusting the face plate eliminates hand wheels, levers, or the like, and makes the device simple and convenient both for manufacture and operation.

Other objects and features of the invention will be best understood from the following detail description of a specific preferred form of the invention, throughout which reference is had to the accompanying drawing in which—

Fig. 1 is a side elevation of the device; Fig. 2 is a sectional view of the device taken as indicated by line 2—2 on Fig. 1; and Fig. 3 is a detailed sectional view of the device taken as indicated by line 3—3 on Fig. 2.

Throughout the drawings numeral 10 designates the frame of the device which is preferably an integral casting formed near its base 11 with a horizontal tapered bore or socket 12 and at its top with a horizontal straight bore 13. The socket 12 and bore 13 are arranged parallel with each other as clearly shown in the drawings. The socket 12 is provided to receive and carry the tapered shank portion 14 of the mandrel 15. When the mandrel 15 is in place the inner end of shank 14 extends into a cored recess 16 formed in frame 10 and is adapted to be engaged by an ejecting pin 17. The ejecting pin 17 is slidably carried in a guide bore 18 coaxial with the socket 12 and is formed at its inner end with a head 19 to engage the inner end of shank 14. The ejecting pin 17 extends somewhat from the frame 10, has a nut 20 screw-threaded on its extended portion, and is preferably case hardened at its extreme end. When it is desired to remove the mandrel from the device the operator strikes or hammers the outer end of the ejecting pin 17 and thereby drives the shank 14 from the socket 12. The inner end of the shank 14 being engaged by the head 19 on the ejecting pin 17 is not injured or deformed in any way upon removing the mandrel as would be the case if the operator hammered directly on the shank. In assembling the device the adjusting pin 17 is arranged in place through the socket 12 and when in place is prevented from becoming displaced by the head 19 on its inner end and the nut 20 on its outer portion.

The mandrel 15 is an accurately turned member having a shank portion 14 adapted to be carried in the tapered socket 12 and a spindle portion 21 adapted to carry the crank pin bearing 22 of a connecting rod 23. It will be understood how a plurality of mandrels 15 having uniform shanks 14 but different sized spindles 21 may be provided with the machine and thereby make it applicable for use in connection with conecting rods having various sized crank-pin bearings 22.

The piston 24 is fitted on the connecting rod 23 before the crank pin bearing 22 is fitted to the spindle 21 thereby permitting of the connecting rod being positioned so that the piston 24 is in position to be engaged by the face plate 25, as shown in Fig. 1. The connecting rod 23 and piston 24 illustrated in the drawings are merely typical members of that character and are merely disclosed for purpose of illustration; therefore it will be understood that the device is not limited for use in connection with a connecting rod and piston of this particular design and construction.

The face plate 25 is a circular member having a perfectly flat smooth surface 26 on its front side and formed with a hollow trunnion 27 at its rear side. The axis of the trunnion 27 is at right angles to the plane of the surface 26 thereby causing the surface 26 to be in a truly vertical plane at right angles to the axis of the mandrel when the trunnion is carried in the horizontal bore 13. In practice the trunnion is made to be a rather tight sliding fit in the bore 13 so that the face plate 25 will not, or cannot, move unless it is deliberately operated by the operator. In the preferred form of the device reinforcing or stiffening ribs 28 are provided at the back of the face plate in order that it will be rigid and accurate.

The operation of the device is extremely simple. When the connecting rod and piston have been arranged as shown in Fig. 1 the face plate is adjusted until its face or surface 26 engages the cylindrical wall of the piston. If the piston and connecting rod are true and accurate the surface 26 will engage the cylindrical wall of the piston throughout the entire height of the piston while if the connecting rod and piston are faulty or are out of alinement the surface 26 will engage the cylindrical wall at only one point. By making the face plate 25 comparatively large, as shown in the drawings, the device is not only applicable to testing pistons carried on connecting rods of various lengths but is also capable of detecting inaccuracies in the connecting rod and piston which could not be found if it were not possible to move both the connecting rod and piston somewhat and still have the piston engage the surface 26. For instance it is possible for the crank-pin bearing 22 and the bearing at the upper end of the connecting rod to be out of alinement and yet get a perfect test between the piston and surface 26 when the connecting rod and piston are in certain relative positions. To detect such inaccuracies as this it is merely necessary to turn or swing the piston on the connecting rod and to swing the connecting rod somewhat on the spindle 21 while the surface 26 is in engagement with the wall of the piston.

In order that the face plate 25 may be easily and accurately adjusted a nut 30 is shrunk into the outer end portion of the trunnion 27 to carry a screw 31 mounted in the frame 10. The screw 31 has a reduced portion 35 carried in a bore 32 concentric with the bore 13 and is held against rotary movement by a key 33. The screw is held against longitudinal displacement or movement by the shoulder 36, formed by the reduced portion 35 engaging one side of that portion of the frame in which the bore 32 is formed, and a nut 38 screw-threaded on the end of the reduced portion 35 to engage the other side of said portion of frame 10. It is preferred that a washer 50 be interposed between the nut 38 and the frame, as shown in the drawings. With this form of construction it will be readily understood how rotation of the face plate 25 will cause rotation of the nut 30 on the screw 31 and thereby cause longitudinal movement of the trunnion 27 in the bore 13. It will be noticed that the adjusting means embodies no distinct or independent operating member such as a hand wheel or a lever but that it is operated through and by the face plate 25 itself. In view of the fact that the face plate is comparatively large the operator has a considerable leverage when he grips and turns it by its periphery thereby making the operation of the device easy as well as simple. Further, by the elimination of hand wheels, operating levers, etc., the construction and appearance of the entire device is materially improved.

Having set forth a preferred embodiment of my invention, I do not wish to limit or restrict myself to the particular details herein above set forth but wish to reserve to myself any changes or variations that may appear to those skilled in the art or that may fall within the scope of the following claims.

Having described a preferred form of my invention, what I claim is:

1. In a device of the character described, a frame formed with a bore, a face plate, a trunnion on the face plate to be carried in the bore, two cooperating screw members arranged in the bore, one in connection with the frame, the other in connection with the trunnion so that relative rotary movement between the frame and the trunnion causes longitudinal movement of the trunnion in the bore.

2. In a device of the character described, a frame formed with a bore, a face plate, a hollow trunnion extending from the face plate into the bore, a nut carried in the trunnion, a screw carried by the frame to extend into the bore and trunnion and to cooperate with the nut so that rotary movement of the trunnion causes longitudinal movement of the trunnion in the bore.

3. In a device of the character described, a frame formed with a socket a bore and a guide, a mandrel carried in the socket, a pin carried in the guide, a head on the pin to engage the mandrel so that movement of the pin will cause ejection of the mandrel from the socket, a face plate, a hollow trunnion extending from the face plate into the bore to carry the face plate so that its face is in a plane at right angles to the axis of the mandrel, a nut carried in the trunnion, a screw carried by the frame to extend into the bore and trunnion and cooperate with the nut so that rotation of the face plate causes longitudinal movement of the trunnion in the bore.

4. In a piston lining device, a frame, a spindle carried by the frame and adapted to have the crank shaft bearing of a connecting rod mounted on it, a face plate carried by the frame to be movable longitudinally of the spindle and having a face transverse of the longitudinal axis of the spindle to engage a piston carried on a connecting rod mounted on the spindle, and a screw mechanism in connection with the face plate and frame to cause movement of the face plate longitudinally of the spindle upon the face plate being rotated.

In witness that I claim the foregoing I have hereunto subscribed my name this 13th day of July 1920.

HIO P. EILERS.

Witness:
VIRGINIA BERINGER.